(No Model.)
C. CALLAHAN.
WATER GATE.
No. 260,936. Patented July 11, 1882.
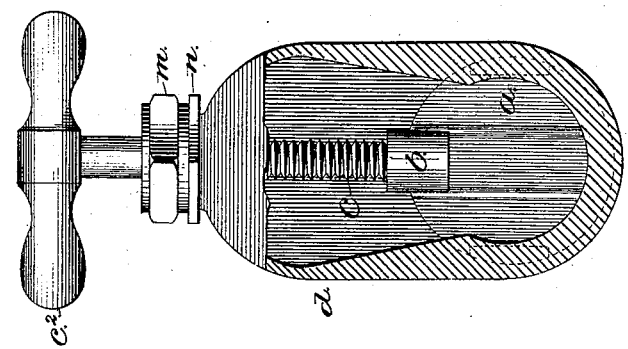
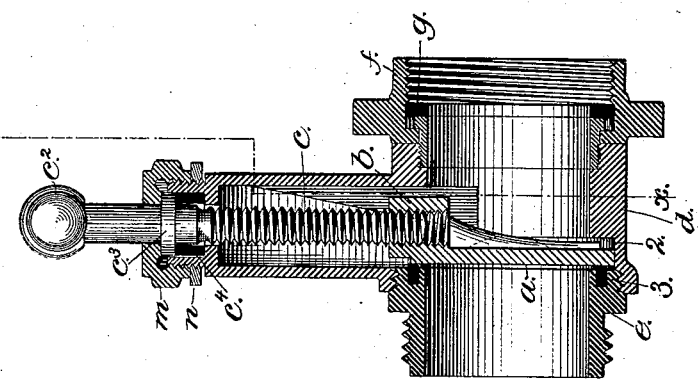
Witnesses.
John F. C. Reinkert.
Bernice J. Noyes.
Inventor.
Cornelius Callahan
By Crosby Gregory
Attys.

UNITED STATES PATENT OFFICE.

CORNELIUS CALLAHAN, OF CHELSEA, MASSACHUSETTS.

WATER-GATE.

SPECIFICATION forming part of Letters Patent No. 260,936, dated July 11, 1882.

Application filed February 16, 1882. (No model.)

*To all whom it may concern:*

Be it known that I, CORNELIUS CALLAHAN, of Chelsea, county of Suffolk, State of Massachusetts, have invented an Improvement in Water-Gates, of which the following description, in connection with the accompanying drawings, is a specification.

This invention has for its object an improved construction of water-gate to be attached to a hydrant, or to a two or more hose coupling, or to an engine, or to a stand-pipe.

Figure 1 is a vertical longitudinal section of a water-gate containing my invention, and Fig. 2 a partial vertical section thereof on the irregular dotted line $x\ x$, Fig. 1.

The gate $a$ is provided with a screw-threaded ear, $b$, to be entered and moved in one or the other direction by the screw $c$, having the handle $c^2$. The gate is held and guided between a shoulder, 2, of the case or shell $d$ and the packing-piece 3, shown as held in a suitable annular groove of the threaded collar $e$, which latter is screwed into the said case or shell opposite the front or smooth face of the gate $a$. The packing-piece is forced firmly against the gate $a$ as the collar $e$ is screwed into the case or shell.

In case of leakage, instead of removing the packing-piece 3, the end of the collar $e$ may be cut away, when the collar may be screwed farther into the case or shell.

To enable the gate to be readily introduced within the shell or case $d$, the screw-threaded opening at that side of it which receives the collar $e$ is of greater diameter than the diameter of the gate, and the inner end of the said collar, with its packing, makes the face guide and bearing for the gate, which features are not in themselves broadly new.

The loose or running spanner-section $f$, to be connected with the male end piece of a piece of hose, is retained upon the case by the flanged and threaded union $g$.

The shank of the screw $c$ has a collar, $c^3$, which at its under side rests upon the washer $c^4$, while the upper side of the said collar is held down closely upon the said washer by the hollow nut $m$.

Below the nut $m$ is a check-nut, $n$, to confine it in place. The nut $m$ and check-nut $n$ may be readily adjusted to maintain close contact of the collar $c^3$ with the washer and nut $m$ as they wear.

I claim—

1. The gate and its actuating-screw and the case or shell having a threaded opening at one side of it of greater diameter than the diameter of the said gate, combined with the screw-threaded collar $e$, provided with the packing 3 to close the said opening and retain the gate in working position, substantially as described.

2. The shell or case $d$, the gate $a$, and the screw $c$, provided with the collar $c^3$, combined with the packing $c^4$, which wholly supports the said collar, and with the nut $m$ and check-nut $n$, to operate substantially as described.

In testimony whereof I have signed my name to this specification in the presence of two subscribing witnesses.

CORNELIUS CALLAHAN.

Witnesses:
G. W. GREGORY,
W. H. SIGSTON.